United States Patent
Takahashi

(10) Patent No.: US 9,413,997 B2
(45) Date of Patent: Aug. 9, 2016

(54) METHOD AND DEVICE FOR PROCESSING CAPTURED-IMAGE SIGNALS

(71) Applicant: FUJITSU LIMITED, Kawasaki-shi, Kanagawa (JP)

(72) Inventor: Satoshi Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 14/033,247

(22) Filed: Sep. 20, 2013

(65) Prior Publication Data

US 2014/0092289 A1    Apr. 3, 2014

(30) Foreign Application Priority Data

Sep. 28, 2012   (JP) ................................. 2012-218207

(51) Int. Cl.
*H04N 5/374* (2011.01)
*H04N 5/353* (2011.01)

(52) U.S. Cl.
CPC ............. *H04N 5/374* (2013.01); *H04N 5/3532* (2013.01)

(58) Field of Classification Search
CPC ... H04N 5/3532; H04N 5/374; H04N 5/3454; H04N 5/3742; H04N 5/376
See application file for complete search history.

(56) References Cited

U.S. PATENT DOCUMENTS

| | | | | |
|---|---|---|---|---|
| 2005/0007460 A1* | 1/2005 | Stavely | ............... | H04N 5/3532 348/222.1 |
| 2007/0154202 A1* | 7/2007 | Lee | ..................... | H04N 5/2353 396/153 |
| 2007/0297026 A1* | 12/2007 | John | ................. | H04N 1/00002 358/486 |
| 2009/0066813 A1* | 3/2009 | Shibata | .................. | H04N 5/335 348/231.99 |
| 2009/0153710 A1* | 6/2009 | John | ................... | H04N 5/23248 348/296 |
| 2009/0201383 A1* | 8/2009 | Slavin | ............... | H04N 5/23248 348/222.1 |
| 2009/0251556 A1 | 10/2009 | Mabuchi | | |
| 2010/0238339 A1 | 9/2010 | Okamoto et al. | | |
| 2010/0321517 A1* | 12/2010 | Yamamoto | ......... | H04N 5/23248 348/222.1 |
| 2011/0228114 A1* | 9/2011 | Tominaga | .......... | H04N 5/23248 348/208.6 |

(Continued)

FOREIGN PATENT DOCUMENTS

| | | |
|---|---|---|
| JP | 59-025483 | 2/1984 |
| JP | 2006-033381 A | 2/2006 |
| JP | 2006-148861 A | 6/2006 |

(Continued)

OTHER PUBLICATIONS

Extended European Search Report of European Patent Application No. 13184781.6 dated Jul. 7, 2014.

(Continued)

*Primary Examiner* — John Villecco
(74) *Attorney, Agent, or Firm* — Maschoff Brennan

(57) ABSTRACT

A device for processing captured-image signals, the device includes a pixel array having a plurality of lines, each having first pixels and second pixels including pixels interposed between the first pixels, a scanner configured to alternately perform, in one frame, first scanning for reading, from the pixel array, captured-image signals of the first pixels along each line in one of a direction from a first one of the lines to a last one thereof and a direction from the last line to the first line and second scanning for reading, from the pixel array, captured-image signals of the second pixels along each line in the other direction, and a processor coupled to a memory and configured to combine the read captured-image signals of the first pixels and the read captured-image signals of the second pixels.

3 Claims, 13 Drawing Sheets

(56) References Cited

U.S. PATENT DOCUMENTS

| | | | |
|---|---|---|---|
| 2013/0229553 A1* | 9/2013 | Suzuki | H04N 5/3532 348/296 |
| 2015/0098014 A1* | 4/2015 | Raskar | H04N 5/3532 348/371 |

FOREIGN PATENT DOCUMENTS

| | | |
|---|---|---|
| JP | 2006-217213 A | 8/2006 |
| JP | 2007-166486 | 6/2007 |
| JP | 2010-154390 A | 7/2010 |
| JP | 2011-004068 A | 1/2011 |
| JP | 2011-199646 | 10/2011 |
| JP | 2012-080490 | 4/2012 |

OTHER PUBLICATIONS

JPOA, Office Action of Japanese Patent Application No. 2012-218207 dated May 17, 2016 with Partial Translation.

* cited by examiner

METHOD AND DEVICE FOR PROCESSING CAPTURED-IMAGE SIGNALS

CROSS-REFERENCE TO RELATED APPLICATION

This application is based upon and claims the benefit of priority of the prior Japanese Patent Application No. 2012-218207, filed on Sep. 28, 2012, the entire contents of which are incorporated herein by reference.

FIELD

The embodiments discussed herein are related to a method and a device for processing captured-image signals.

BACKGROUND

In recent years, complementary metal-oxide semiconductor (CMOS) image sensors, which feature low cost since they are mass-producible in a simple manufacturing process, small power consumption since the element sizes are small, and so on, compared with charge-coupled device (CCD) image sensors, have attracted attention.

In CMOS image sensors, a rolling shutter system in which the shutter is sequentially released for each scan line is typically employed to read captured-image signals. When the rolling shutter system is employed to read captured-image signals of all pixels in one frame, signals are read line by line in sequence from the uppermost line in a pixel array toward the lowermost line in the pixel array. Thus, a time difference occurs between when the reading is started and when the reading is completed, so that the exposure timing at an upper portion of a screen and the exposure timing at a lower portion thereof differ from each other. Consequently, when a camera having a CMOS image sensor is used to capture an image of a moving subject, a rolling shutter phenomenon, in which the subject is obliquely distorted in the captured image, occurs. The rolling shutter phenomenon may also be called the focal plane phenomenon.

There are also related technologies in which two images acquired sequentially are combined to correct an image in which the rolling shutter phenomenon occurs. In the related technologies, the scan direction for a first image and the scan direction for a second image are set to be different from each other to thereby cause the directions in which distortions occur to differ from each other. The first and second images in which the directions of the respective distortions differ from each other are combined to correct moving-subject distortion in the captured image. These technologies are disclosed in, for example, Japanese Laid-open Patent Publication No. 2011-004068, Japanese Laid-open Patent Publication No. 2010-154390, Japanese Laid-open Patent Publication No. 2006-148861, and Japanese Laid-open Patent Publication No. 2006-033381.

SUMMARY

According to an aspect of the invention, a device for processing captured-image signals, the device includes a pixel array having a plurality of lines, each having first pixels and second pixels including pixels interposed between the first pixels, a scanner configured to alternately perform, in one frame, first scanning for reading, from the pixel array, captured-image signals of the first pixels along each line in one of a direction from a first one of the lines to a last one thereof and a direction from the last line to the first line and second scanning for reading, from the pixel array, captured-image signals of the second pixels along each line in the other direction, and a processor coupled to a memory and configured to combine the read captured-image signals of the first pixels and the read captured-image signals of the second pixels.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
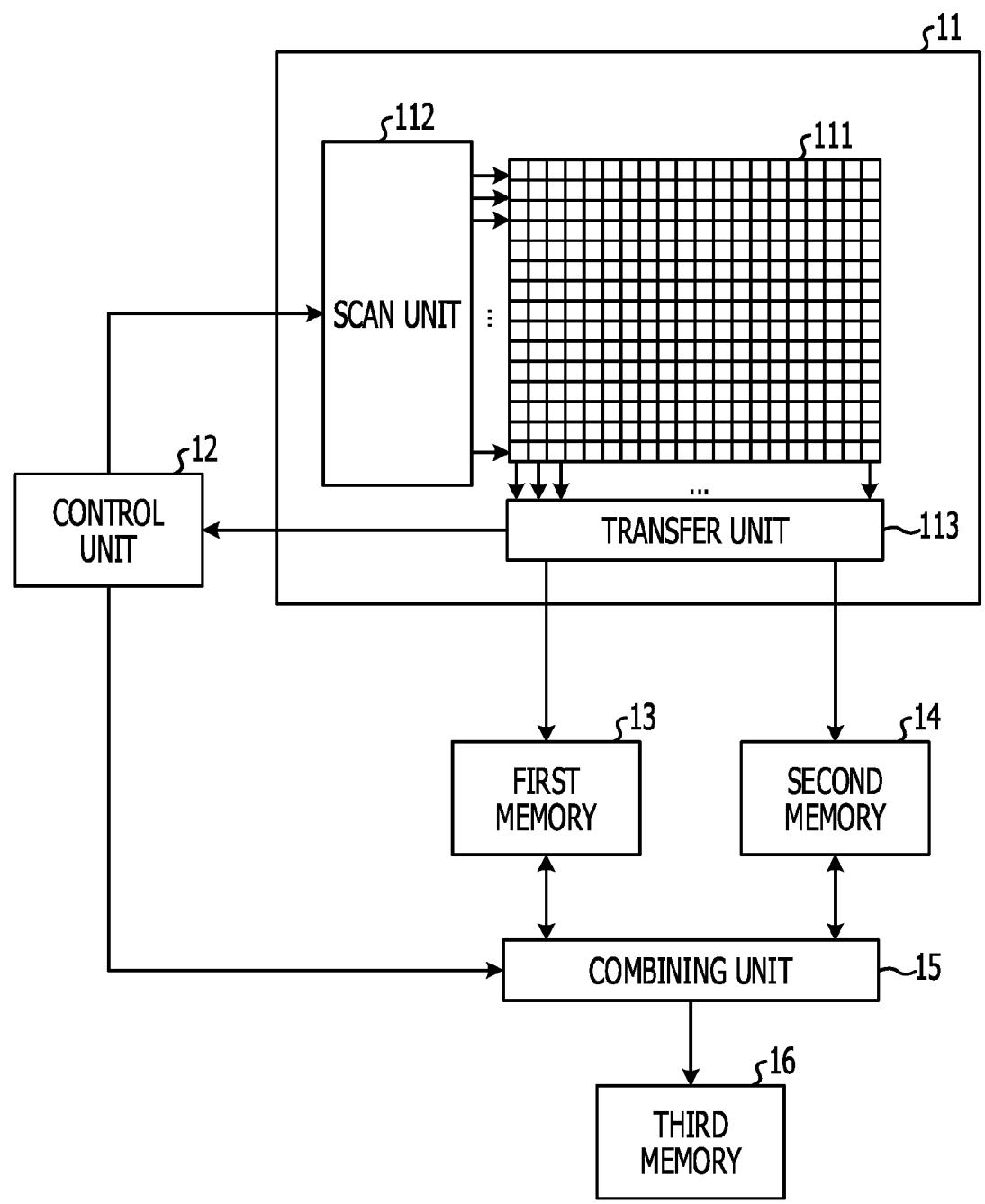
FIG. 1 is a block diagram illustrating an example of a captured-image-signal processing device according to a first embodiment.

In the related technologies described above, two images acquired sequentially are used in order to correct distortion. However, the two images to be used have a time difference in their image-capture timings. Thus, there is a possibility that an uncorrectable level of difference occurs between the two images. Hence, with the related technologies, there is a possibility that an image in which the rolling shutter phenomenon occurs is not correctable.

Embodiments of a captured-image-signal processing device and a captured-image-signal processing method disclosed herein are described below in detail with reference to the accompanying drawings. It is, however, to be noted that the captured-image-signal processing device and the captured-image-signal processing method disclosed herein are not limited by the embodiments. In each embodiment, elements having substantially the same functions are denoted by the same reference numerals, and redundant descriptions are not given. In addition, in each embodiment, substantially the same processes are denoted by the same reference numerals, and redundant descriptions are not given.

First Embodiment

Configuration of Captured-Image-Signal Processing Device

FIG. 1 is a block diagram illustrating an example of a captured-image-signal processing device according to a first embodiment. In FIG. 1, a captured-image-signal processing device 10 includes an image capture sensor 11, a control unit 12, a first memory 13, a second memory 14, a combining unit 15, and a third memory 16. The image capture sensor 11 includes a pixel array section 111, a scan unit 112, and a transfer unit 113. The pixel array section 111 includes pixels arranged in a two-dimensional array (in a matrix). The captured-image-signal processing device 10 has a processor. The embodiments of the present technology also encompass a program for causing a processor to function as the control unit 12 and the combining unit 15 and recording media storing the program. The recording media are non-transitory media and do not include transient media covering signals per se. The control unit 12 is, for example, a central processing unit (CPU) for controlling individual devices and for computing and processing data. In FIG. 1, a case in which the pixel array section 111 is constituted by 300 pixels, specifically, 20 pixels×15 lines, is depicted as an example.

Under the control of the control unit 12, the scan unit 112 scans the pixel array section 111 to read out, for each line, the captured-image signals of the pixels in the pixel array section 111 to the transfer unit 113 in parallel.

The transfer unit 113 converts the captured-image signals, read from the pixel array section 111 in parallel, into a series of captured-image signals and transfers the series of captured-image signals to the first memory 13 or the second memory 14. Each time the transfer for each line is completed, the transfer unit 113 outputs a signal indicating that the transfer is completed (this signal may hereinafter be referred to as a "transfer completion signal") to the control unit 12.

Each of the first memory 13 and the second memory 14 stores therein the captured-image signals transferred from the transfer unit 113.

Each time the transfer completion signal is input from the transfer unit 113 to the control unit 12, the control unit 12 outputs, to the scan unit 112, a signal indicating that the line to be scanned (i.e., the scan line) is to be changed (the signal may hereinafter be referred to as a "scan-line control signal"). Each time the scan-line control signal is input from the control unit 12 to the scan unit 112, the scan unit 112 changes the scan line to read the captured-image signals from the pixel array section 111.

When the transfer completion signals for all of the lines in the pixel array section 111 have been input from the transfer unit 113 to the control unit 12, that is, when the captured-image signals of the pixels on all of the lines in the pixel array section 111 have been transferred to the first memory 13 and the second memory 14, the control unit 12 outputs, to the combining unit 15, a signal indicating that a composite image is to be generated (the signal may hereinafter be referred to as a "combination instruction signal").

In accordance with the combination instruction signal input from the control unit 12, the combining unit 15 obtains the captured-image signals from the first memory 13 and the captured-image signals from the second memory 14 and combines the captured-image signals obtained from the first memory 13 and the captured-image signals obtained from the second memory 14 to generate a composite image. The combining unit 15 outputs the generated composite image to the third memory 16.

The third memory 16 stores therein the composite image input from the combining unit 15.

The image capture sensor 11 is implemented by, for example, a CMOS image sensor. The control unit 12 and the combining unit 15 are implemented by, for example, an imaging signal processor (ISP). Each of the first memory 13, the second memory 14, and the third memory 16 is implemented by, for example, a flash memory, a read only memory (ROM), or a random access memory (RAM), such as a synchronous dynamic random access memory (SDRAM). In FIG. 1, the first memory 13, the second memory 14, and the third memory 16 are illustrated as physically different memories. However, the first memory 13, the second memory 14, and the third memory 16 may be implemented by a single memory. When the first memory 13, the second memory 14, and the third memory 16 are implemented by a single memory, the area of the single memory may be divided into a plurality of areas.

<Processing Performed by Scan Unit>

Figure 2:
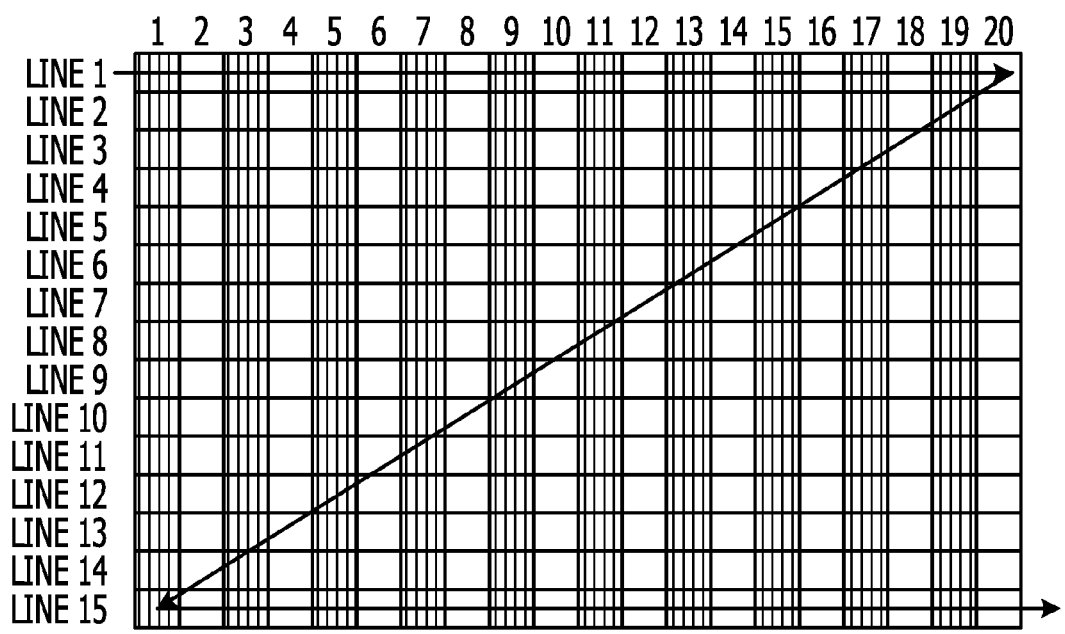
FIG. 2 is a diagram used to describe processing (on odd-numbered pixels) performed by a scan unit in the first embodiment.
Figure 3:
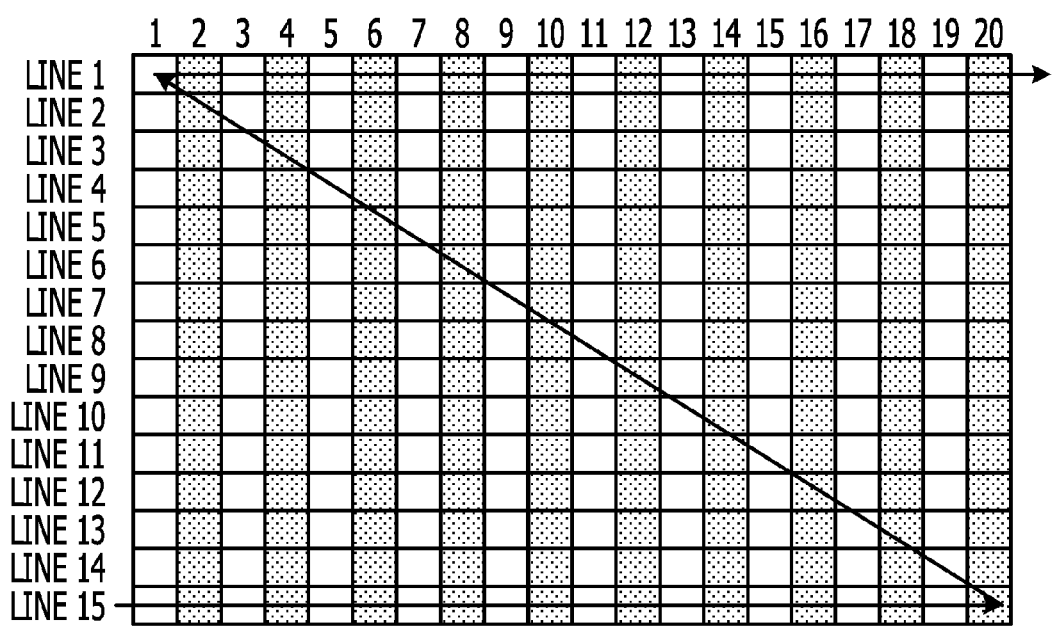
FIG. 3 is a diagram used to describe processing (on even-numbered pixels) performed by the scan unit in the first embodiment.

FIG. 2 is a diagram used to describe processing (on odd-numbered pixels) performed by the scan unit 112 in the first embodiment. FIG. 3 is a diagram used to describe processing (on even-numbered pixels) performed by the scan unit 112 in the first embodiment. In FIGS. 2 and 3, a case in which the pixel array section 111 is constituted by 300 pixels, specifically, 20 pixels×15 lines, is depicted as an example.

As illustrated in FIGS. 2 and 3, the pixel array section 111 includes a plurality of lines 1 to 15, each having ten odd-numbered pixels and ten even-numbered pixels.

First, as illustrated in FIG. 2, the scan unit 112 scans the pixels in sequence starting from the first pixel along line 1 in the pixel array section 111; specifically, it scans the first pixel, the third pixel, the fifth pixel, the seventh pixel, the ninth pixel, the 11th pixel, the 13th pixel, the 15th pixel, the 17th pixel, and the 19th pixel in sequence from a front side of line 1 to a rear side thereof, to read out the captured-image signals of the pixels to the transfer unit 113 in parallel. The transfer unit 113 transfers the read captured-image signals of the odd-numbered pixels on line 1 to the first memory 13.

Next, as illustrated in FIG. 3, the scan unit 112 scans the pixels in sequence starting from the second pixel along line 15 in the pixel array section 111; specifically, it scans the second pixel, the fourth pixel, the sixth pixel, the eighth pixel, the tenth pixel, the 12th pixel, the 14th pixel, the 16th pixel, the 18th pixel, and the 20th pixel in sequence from the front side of line 15 to the rear side thereof, to read out the captured-image signals of the pixels to the transfer unit 113 in parallel. The transfer unit 113 transfers the read captured-image signals of the even-numbered pixels on line 15 to the second memory 14.

Next, as illustrated in FIG. 2, the scan unit 112 scans the pixels in sequence starting from the first pixel along line 2 in the pixel array section 111; specifically, it scans the first pixel, the third pixel, the fifth pixel, the seventh pixel, the ninth pixel, the 11th pixel, the 13th pixel, the 15th pixel, the 17th pixel, and the 19th pixel in sequence from the front side of line 2 to the rear side thereof, to read out the captured-image signals of the pixels to the transfer unit 113 in parallel. The transfer unit 113 transfers the read captured-image signals of the odd-numbered pixels on line 2 to the first memory 13.

Next, as illustrated in FIG. 3, the scan unit 112 scans the pixels in sequence starting from the second pixel along line 14 in the pixel array section 111; specifically, it scans the second pixel, the fourth pixel, the sixth pixel, the eighth pixel, the tenth pixel, the 12th pixel, the 14th pixel, the 16th pixel, the 18th pixel, and the 20th in sequence from the front side of line 14 to the rear side thereof, to read out the captured-image signals of the pixels to the transfer unit 113 in parallel. The transfer unit 113 transfers the read captured-image signals of the even-numbered pixels on line 14 to the second memory 14.

Thereafter, the scan unit 112 alternately repeats, in one frame, scanning for reading the captured-image signals of the odd-numbered pixels along each line (this scanning may hereinafter be referred to as "first scanning"), as illustrated in FIG. 2, and scanning for reading the captured-image signals of the even-numbered pixels along each line (this scanning may hereinafter be referred to as "second scanning"), as illustrated in FIG. 3.

That is, the scan unit 112 alternately performs, in one frame, scanning of the odd-numbered pixels in order from line 1 to line 15, as illustrated in FIG. 2, and scanning of the even-numbered pixels in order from line 15 to line 1, as illustrated in FIG. 3.

As a result, the captured-image signals of the odd-numbered pixels are stored in the first memory 13 in order from line 1 to line 15. On the other hand, the captured-image signals of the even-numbered pixels are stored in the second memory 14 in order from line 15 to line 1.

The above description has been given of an example in which the first scanning is performed in order from line 1 to line 15 and the second scanning is performed in order from line 15 to line 1. However, the arrangement may also be such that the first scanning is performed in order from line 15 to line 1 and the second scanning is performed in order from line 1 to line 15. The above description has also been given of a case in which the first scanning and the second scanning are performed for each horizontal line. However, the first scanning and the second scanning may be performed for each vertical line. That is, in the first embodiment, in one frame, one of the first scanning and the second scanning is performed in a direction from the first line to the last line and the other scanning is performed in a direction from the last line to the first line.

In the above description, the first scanning is scanning for reading the captured-image signals of the odd-numbered pixels along each line and the second scanning is scanning for reading the captured-image signals of the even-numbered pixels along each line. The first scanning, however, is not limited to scanning performed on the odd-numbered pixels. Similarly, the second scanning is not limited to scanning performed on the even-numbered pixels. More specifically, for example, the arrangement may be such that the first scanning is performed on the first pixel, the second pixel, the fifth pixel, the sixth pixel, the ninth pixel, the tenth pixel, the 13th pixel, the 14th pixel, the 17th pixel, and the 18th pixel and the second scanning is performed on the third pixel, the fourth pixel, the seventh pixel, the eighth pixel, the 11th pixel, the 12th pixel, the 15th pixel, the 16th pixel, the 19th pixel, and the 20th pixel. That is, the arrangement may also be such that the first scanning is performed on every other pair of pixels in sequence starting from the first pixel and the second scanning is performed on every other pair of pixels in sequence starting from the third pixel. The interval of the pixels on which the first scanning and the second scanning are performed is not limited to two pixels and may be three or more pixels. In addition, the interval of the pixels on which the first scanning is performed and the interval of the pixels on which the second scanning is performed may be different from each other. That is, in the first embodiment, it suffices that the pixels interposed between the pixels on which the first scanning is performed are included in the pixels on which the second scanning is performed.

However, when the first scanning is performed on the odd-numbered pixels and the second scanning is performed on the even-numbered pixels in the manner described above, it is possible to minimize the pixel interval between the first scanning and the second scanning. This makes it possible to perform distortion correction with high accuracy.

Figure 4:
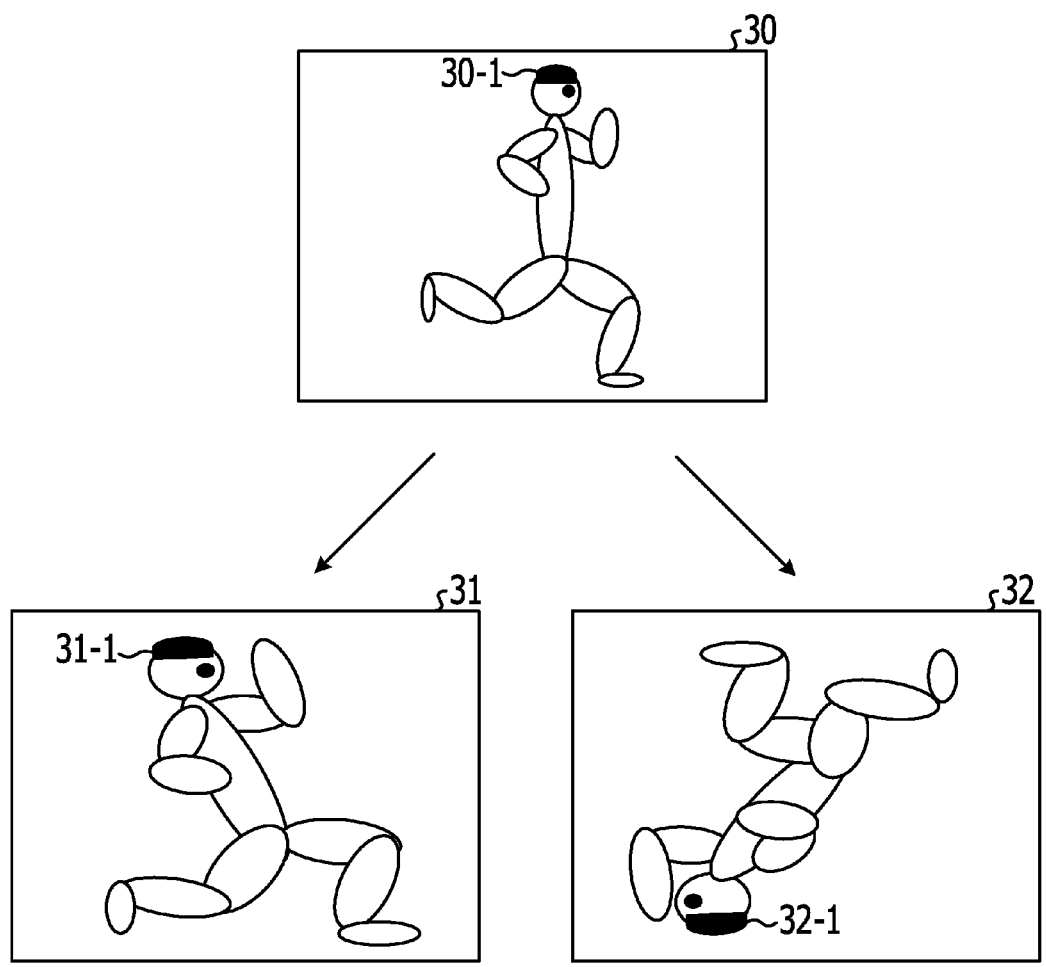
FIG. 4 depicts examples of images resulting from processing performed by the scan unit in the first embodiment.

FIG. 4 depicts examples of images resulting from the processing performed by the scan unit 112 in the first embodiment.

For example, when an image of a subject 30-1 moving from left to right in an image capture range 30 is captured, the scan unit 112 performs the first scanning in order from line 1 to line 15. Thus, as a result of the first scanning, an image 31 including a distorted subject image 31-1 is acquired. The image 31-1 is wider than the subject 30-1. The image 31 is stored in the first memory 13.

In addition, since the scan unit 112 performs the second scanning in order from line 15 to line 1, an image 32 obtained by turning an image 30 (captured from the image capture range 30) upside down (i.e., by rotating the image 30 by 180°) is acquired by the second scanning during image capture of the same subject 30-1. The image 32 also includes a distorted subject image 32-1. The image 32-1 is wider than the subject 30-1. The image 32 is stored in the second memory 14.

<Operation of Captured-Image-Signal Processing Device>

Figure 5:
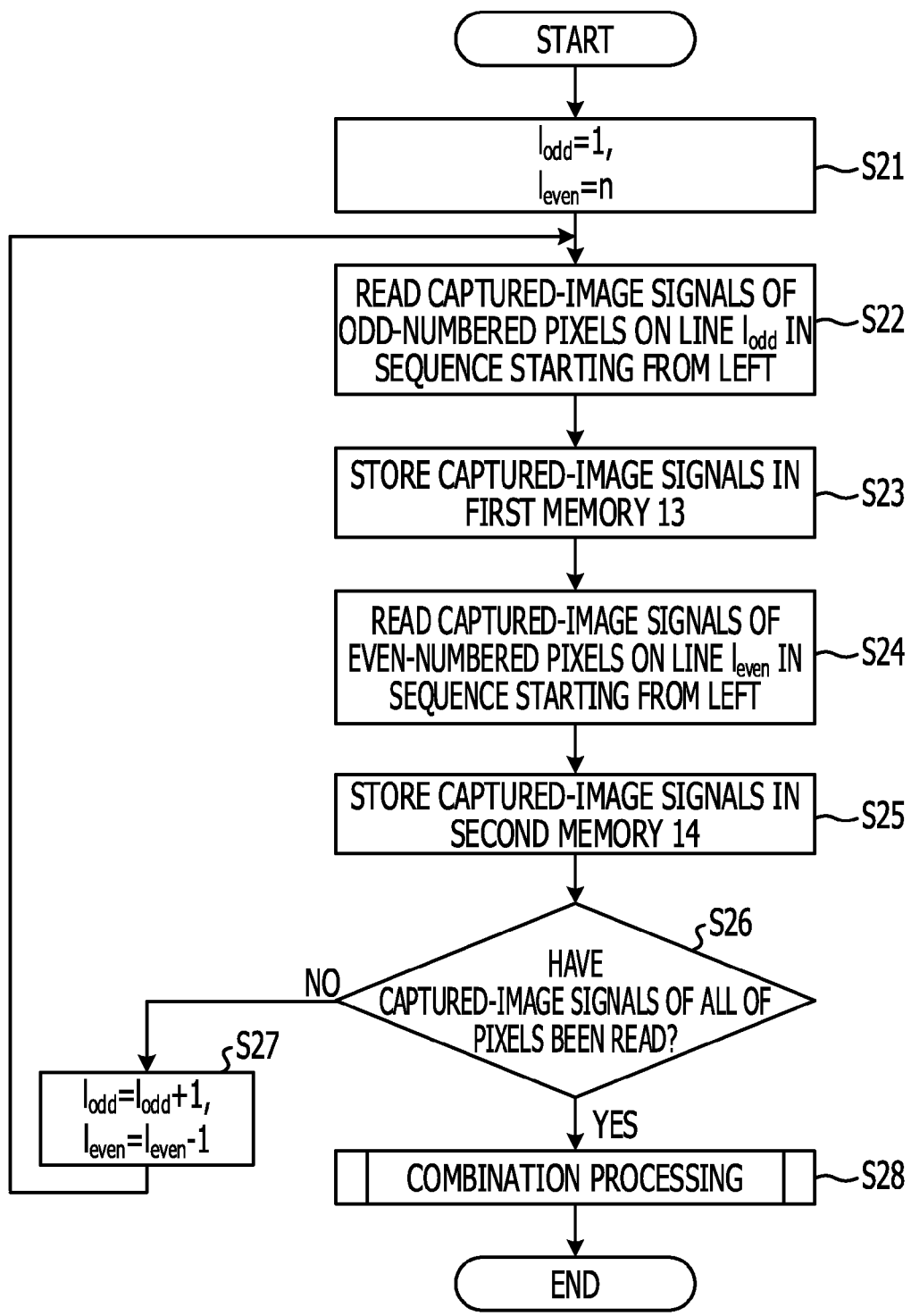
FIG. 5 is a flowchart illustrating an operation of the captured-image-signal processing device according to the first embodiment.

FIG. 5 is a flowchart illustrating an operation of the captured-image-signal processing device according to the first embodiment. FIG. 5 illustrates a case in which the pixel array section 111 includes n lines, that is, lines 1 to n.

First, in step S21, the scan unit 112 performs setting such that $l_{odd}=1$ and $l_{even}=n$, where $l_{odd}$ indicates an odd-numbered line and $l_{even}$ indicates an even-numbered line.

Next, in step S22, the scan unit 112 reads out the captured-image signals of the odd-numbered pixels on the line $l_{odd}$ in sequence starting from the left of the line $l_{odd}$, that is, from the front side of the line $l_{odd}$ to the rear side thereof, to the transfer unit 113.

Next, in step S23, the transfer unit 113 transfers the captured-image signals of the odd-numbered pixels on the line $l_{odd}$ to the first memory 13, so that the captured-image signals are stored therein. At this point in time, the transfer unit 113 outputs a transfer completion signal to the control unit 12.

Next, in step S24, the scan unit 112 reads out the captured-image signals of the even-numbered pixels on the line $l_{even}$ in sequence starting from the left of the line $l_{even}$, that is, from the front side of the line $l_{even}$ to the rear side thereof, to the transfer unit 113.

Next, in step S25, the transfer unit 113 transfers the captured-image signals of the even-numbered pixels on the line $l_{even}$ to the second memory 14, so that the captured-image signals are stored therein. At this point in time, the transfer unit 113 outputs a transfer completion signal to the control unit 12.

Next, in step S26, the control unit 12 determines whether or not the captured-image signals of all of the pixels in one frame have been read. When the number of inputs of the transfer completion signal from the transfer unit 113 is smaller than n×2, the control unit 12 determines that the reading of the captured-image signals of all of the pixels has not been completed (NO in step S26) and outputs a scan-line control signal to the scan unit 112. On the other hand, when the number of inputs of the transfer completion signal from the transfer unit 113 reaches n×2, the control unit 12 determines that the reading of the captured-image signals of all of the pixels has been completed (YES in step S26) and outputs a combination instruction signal to the combining unit 15.

When the result of the determination in step S26 is NO, the process proceeds to step S27 in which the scan unit 112 updates $1_{odd}$ and $1_{even}$ such that $1_{odd}=1_{odd}+1$ and $1_{even}=1_{even}-1$ in accordance with the scan-line control signal input from the control unit 12. Thereafter, the process returns to step S22.

When the result of the determination in step S26 is YES, the process proceeds to step S28 in which the combining unit 15 performs processing for combining images in accordance with the combination instruction signal input from the control unit 12.

<Processing Performed by Combining Unit>

Figure 6:
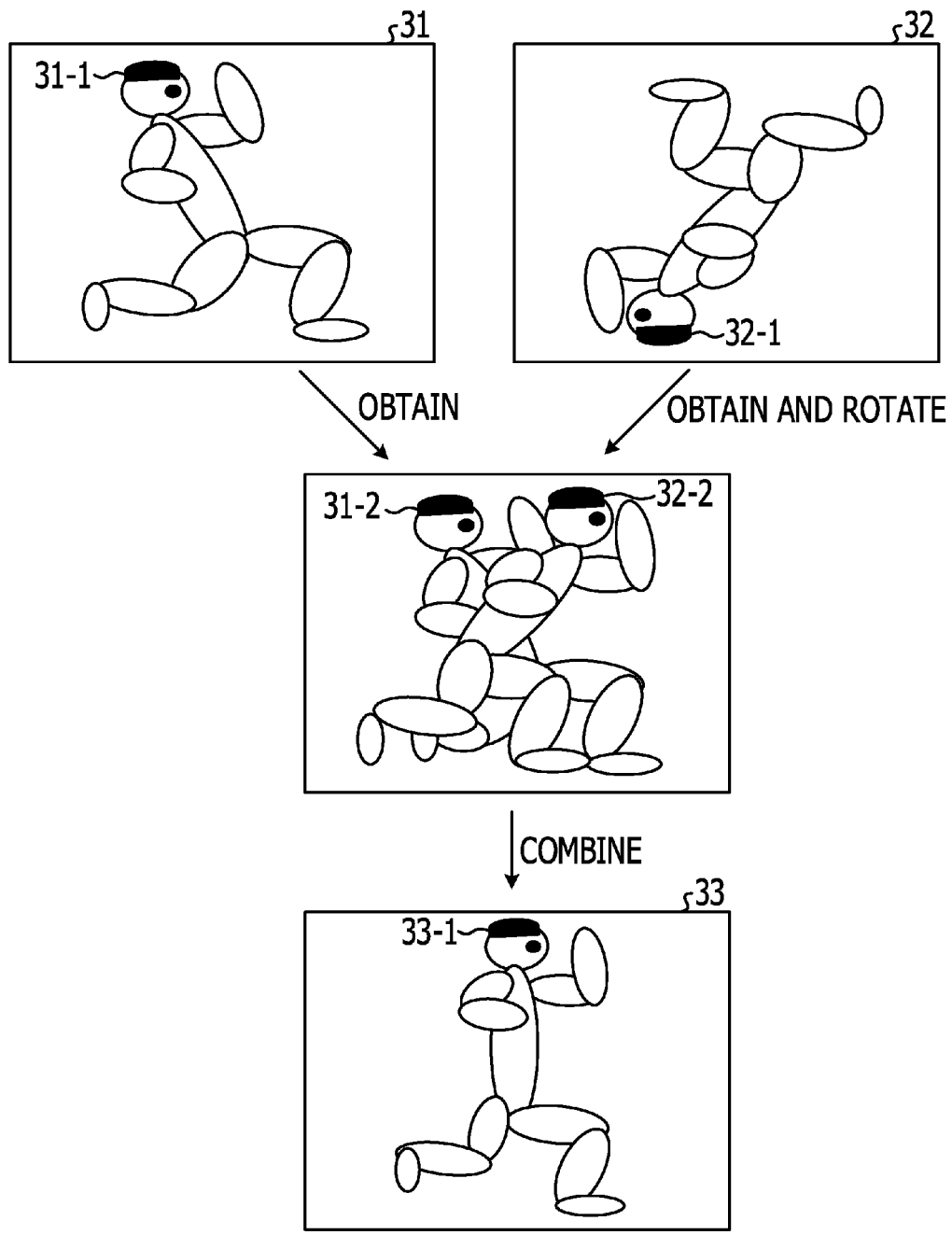
FIG. 6 depicts examples of images resulting from processing performed by a combining unit in the first embodiment.

FIG. 6 depicts examples of images resulting from processing performed by the combining unit 15 in the first embodiment.

An image 31 has been stored in the first memory 13. The image 31 is constituted by the captured-image signals of the odd-numbered pixels on the lines in the pixel array section 111. An image 32 has also been stored in the second memory 14. The image 32 is constituted by the captured-image signals of the even-numbered pixels on the lines in the pixel array section 111.

In accordance with a combination instruction signal input from the control unit 12, the combining unit 15 obtains the image 31 from the first memory 13 and obtains the image 32 from the second memory 14. A distorted image 31-1 included in the image 31 obtained by the combining unit 15 is depicted as an image 31-2, and an image obtained by 180° rotation of a distorted image 32-1, included in the image 32 obtained by the combining unit 15, is depicted as an image 32-2.

The combining unit 15 combines the images 31-2 and 32-2 to generate a composite image 33-1. That is, the combining unit 15 combines the captured-image signals of the odd-numbered pixels, the captured-image signals being read from the pixel array section 111 by the first scanning, and the captured-image signals of even-numbered pixels, the captured-image signals being read from the pixel array section 111 by the second scanning. As a result, the composite image 33-1, which is a distortion-corrected image, is obtained. An image 33 including the composite image 33-1 is stored in the third memory 16.

Figure 7:
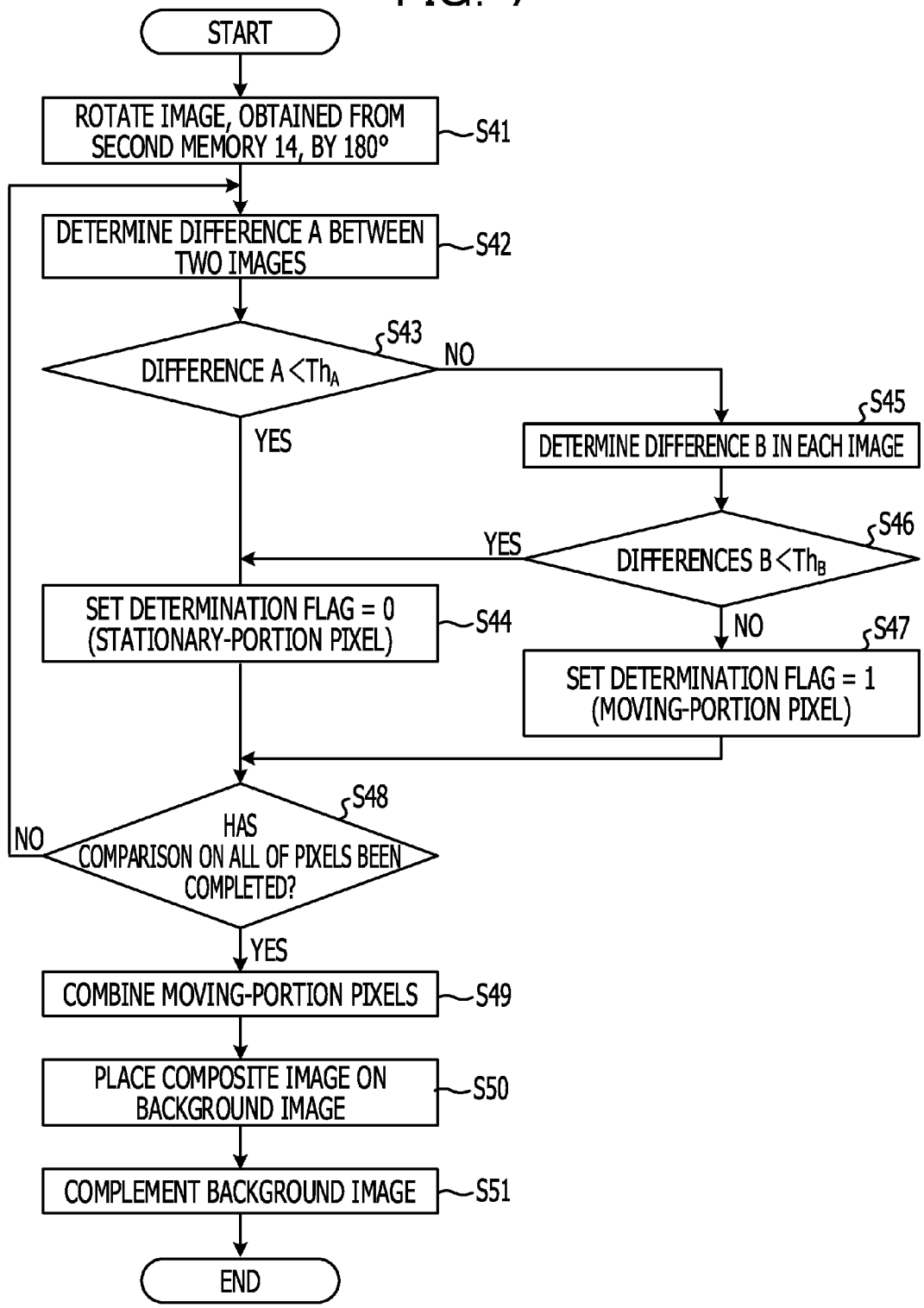
FIG. 7 is a flowchart illustrating processing performed by the combining unit in the first embodiment.

FIG. 7 is a flowchart illustrating processing performed by the combining unit 15 in the first embodiment. The series of processes illustrated in FIG. 7 corresponds to the combination process in step S28 illustrated in FIG. 5.

The combining unit 15 performs processes in steps S42 to S48 on all of the pixels in one frame pixel by pixel in sequence from the first pixel on line 1 to the 20th pixel on line 15.

First, in step S41, the combining unit 15 rotates the image obtained from the second memory 14, that is, the image 32, by 180°.

Next, in step S42, the combining unit 15 determines a difference A between the two images. More specifically, the combining unit 15 performs comparison between a pixel of the image 31 and a pixel of the image obtained by rotating the image 32 by 180°, the pixels being located at the corresponding positions, to determine a difference A including a luminance difference between the pixels and a chromaticity difference between the pixels. The difference A to be determined by the combining unit 15 is, for example, an average value of a luminance difference between the pixels and a chromaticity difference between the pixels.

Next, in step S43, the combining unit 15 determines whether or not the difference A is smaller than a threshold $Th_A$.

When the difference A is smaller than the threshold $Th_A$ (YES in step S43), the process proceeds to step S44 in which the combining unit 15 determines that the pixel at the position of interest is a stationary-portion pixel and sets, for the position of that pixel, determination flag=0 indicating that the pixel is a stationary-portion pixel.

On the other hand, when the difference A is larger than or equal to the threshold $Th_A$ (NO in step S43), the process proceeds to step S45 in which the combining unit 15 determines a difference B in each image. More specifically, the combining unit 15 compares a pixel included in the image 31 and subjected to the comparison in step S42 with four pixels (that is, the upper, lower, left, and right pixels) adjacent to that pixel to determine a difference B including luminance differences between the pixels and chromaticity differences between the pixels. Similarly, the combining unit 15 compares a pixel included in the image obtained by rotating the image 32 by 180° and subjected to the comparison in step S42 with four pixels (that is, the upper, lower, left, and right pixels) adjacent to that pixel to determine a difference B including luminance differences between the pixels and chromaticity differences between the pixels. The difference B to be determined by the combining unit 15 is, for example, an average value of luminance differences between the pixels and chromaticity differences between the pixels.

Next, in step S46, the combining unit 15 determines whether or not each of the difference B obtained from the image 31 and the difference B obtained from the image obtained by rotating the image 32 by 180° is smaller than a threshold $Th_B$.

When both of the difference B obtained from the image 31 and the difference B obtained from the image obtained by the rotation are smaller than the threshold $Th_B$ (YES in step S46), the process proceeds to step S44 in which the combining unit 15 determines that the pixel at the position of interest is a stationary-portion pixel and sets, for the position of that pixel, determination flag=0 indicating that the pixel is a stationary-portion pixel.

On the other hand, when either or both of the differences B are larger than or equal to the threshold $Th_B$ (NO in step S46), the process proceeds to step S47 in which the combining unit 15 determines that the pixel at the position of interest is a moving-portion pixel and sets, for the position of that pixel, determination flag=1 indicating that the pixel is a moving-portion pixel.

Next, in step S48, the combining unit 15 determines whether or not the comparison has been performed on all of the pixels in one frame.

When the comparison has not been completed on all of the pixels in one frame (NO in step S48), the process of the combining unit 15 returns to step S42.

As a result of the series of processes in steps S42 to S48 being performed on all of the pixels in one frame, determination flags=1 are set for the positions where the distorted image 31-2 is located in the image 31 and the positions where the distorted image 32-2 is located in the image obtained by rotating the image 32 by 180°. Determination flags=0 are set for the positions other than the positions for which determination flags=1 are set.

When the comparison is completed on all of the pixels in one frame (YES in step S48), the process proceeds to step S49 in which the combining unit 15 combines the captured-image signals of the moving-portion pixels in the image 31 and the captured-image signals of the moving-portion pixels in the image obtained by rotating the image 32 by 180°, to thereby generate a composite image.

Next, in step S50, the combining unit 15 places the composite image on a background image in the image 31 or a background image in the image 32. The background image is constituted by the captured-image signals of the stationary-portion pixels.

In step S51, the combining unit 15 complements the background image.

Figure 8:
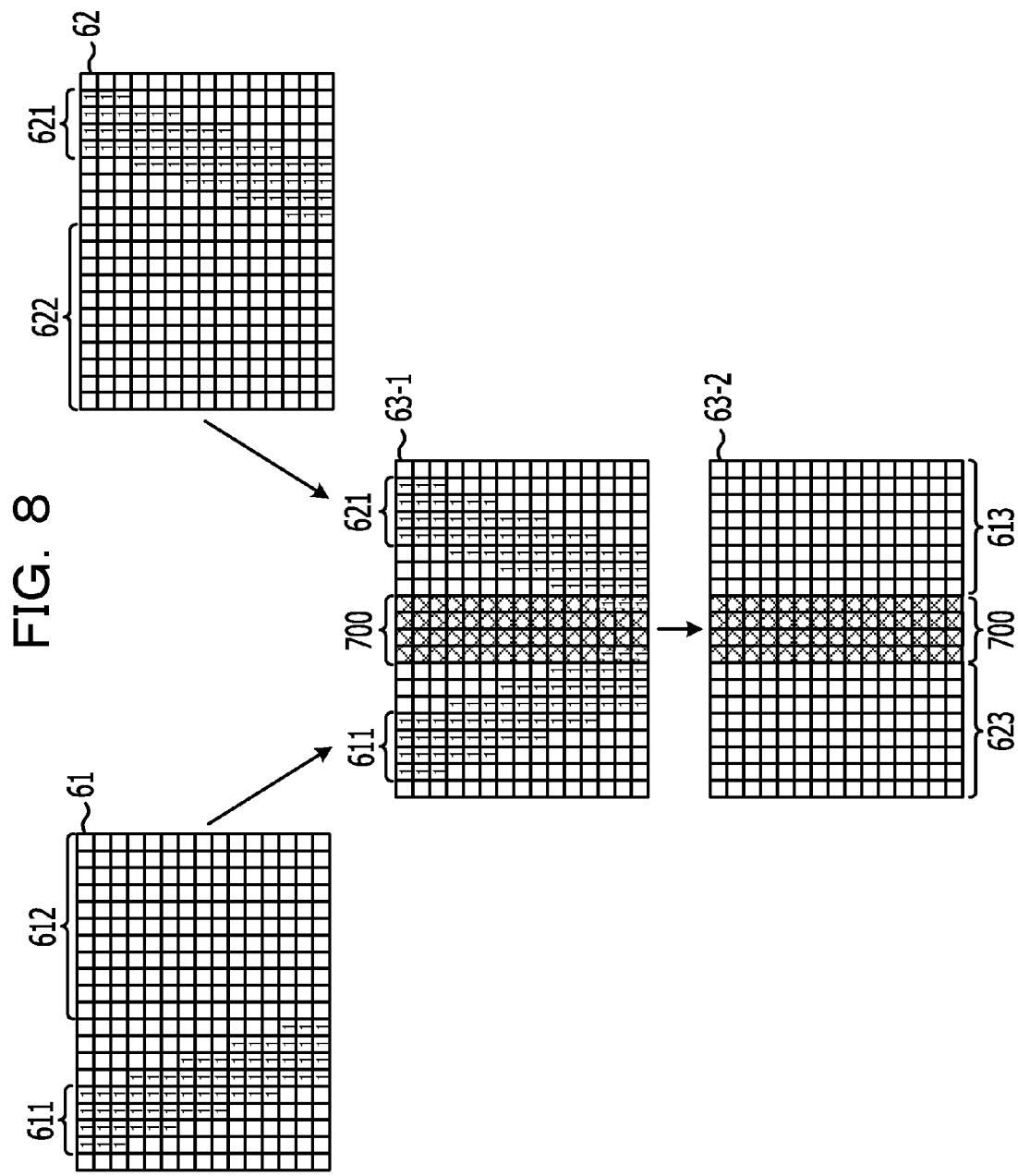
FIG. 8 illustrates processing performed by the combining unit in the first embodiment.

FIG. 8 illustrates processing performed by the combining unit 15 in the first embodiment. In FIG. 8, only the pixels for which determination flags=1 are set are illustrated, and the pixels for which determination flags=0 are set are not illustrated.

In FIG. 8, an image 61 corresponds to the image 31 in FIG. 6, and an image 62 corresponds to the image obtained by rotating the image 32 in FIG. 6 by 180°. An image included in the image 61 and constituted by the captured-image signals of a pixel group 611 for which determination flags=1 are set corresponds to the distorted image 31-2 in FIG. 6, and an image included in the image 62 and constituted by the captured-image signals of a pixel group 621 for which determination flags=1 are set corresponds to the distorted image 32-2 in FIG. 6. The captured-image signals of the pixel groups 612 and 622 for which determination flags=0 are set constitute a background image. A composite image 700 illustrated in FIG. 8 corresponds to the composite image 33-1 illustrated in FIG. 6.

The combining unit 15 selects, from the pixel group 611 and the pixel group 621, pixels existing at the corresponding positions therein and having the same color, and combines the captured-image signals of the selected pixels. As a result, the composite image 700, which is a distortion-corrected image whose color tone is maintained, is obtained. Thus, an image 63-1 including the composite image 700 is generated.

Next, the combining unit 15 places the composite image 700 on a background-only image obtained by deleting the image, constituted by the captured-image signals of the pixel group 611, from the image 61 or a background-only image obtained by deleting the image, constituted by the captured-image signals of the pixel group 621, from the image 62. In this case, the combining unit 15 places the composite image 700 at a center position between the pixel groups 611 and 621. As a result, an image 63-2 including the composite image 700 and one of the background images to the left and right of the composite image 700 is generated.

When the composite image 700 is placed on the background-only image of the image 61, the combining unit 15 complements the image 63-2 by using an image constituted by some of the pixels of the pixel group 622 as a background image 623. Alternatively, when the composite image 700 is placed on the background-only image of the image 62, the combining unit 15 complements the image 63-2 by using an image constituted by some of the pixels of the pixel group 612 as a background image 613.

As described above, according to the first embodiment, the pixel array section 111 in the captured-image-signal processing device 10 has a plurality of lines, each having first pixels and second pixels including pixels interposed between the first pixels. The scan unit 112 alternately performs, in one frame, the first scanning for reading, from the pixel array section 111, the captured-image signals of the first pixels along each line in one of the direction from the first line to the last line and the direction from the last line to the first line and the second scanning for reading, from the pixel array section 111, the captured-image signals of the second pixels along each line in the other direction. The combining unit 15 combines the read captured-image signals of the first pixels and the read captured-image signals of the second pixels. Thus, according to the first embodiment, the captured-image signals read by the first scanning and the captured-image signals read by the second scanning are usable as captured-image signals in a single frame. That is, according to the first embodiment, it is possible to correct distortion in an image by obtaining, from the image, two images in which the directions of distortions are different from each other and combining the two images. Thus, the first embodiment allows a distorted image to be corrected within one frame. Hence, according to the first embodiment, it is possible to ensure that an image in which the rolling shutter phenomenon occurs is corrected.

Second Embodiment

A second embodiment is the same as the first embodiment in that, in one frame, one of the first scanning and the second scanning is performed in a direction from the first line to the last line and the other scanning is performed in a direction from the last line to the first line. The second embodiment, however, is different from the first embodiment in that one of the first scanning and the second scanning is performed from the front side of each line to the rear side thereof and the other scanning is performed from the rear side of each line to the front side thereof.

<Processing Performed by Scan Unit>

Figure 9:
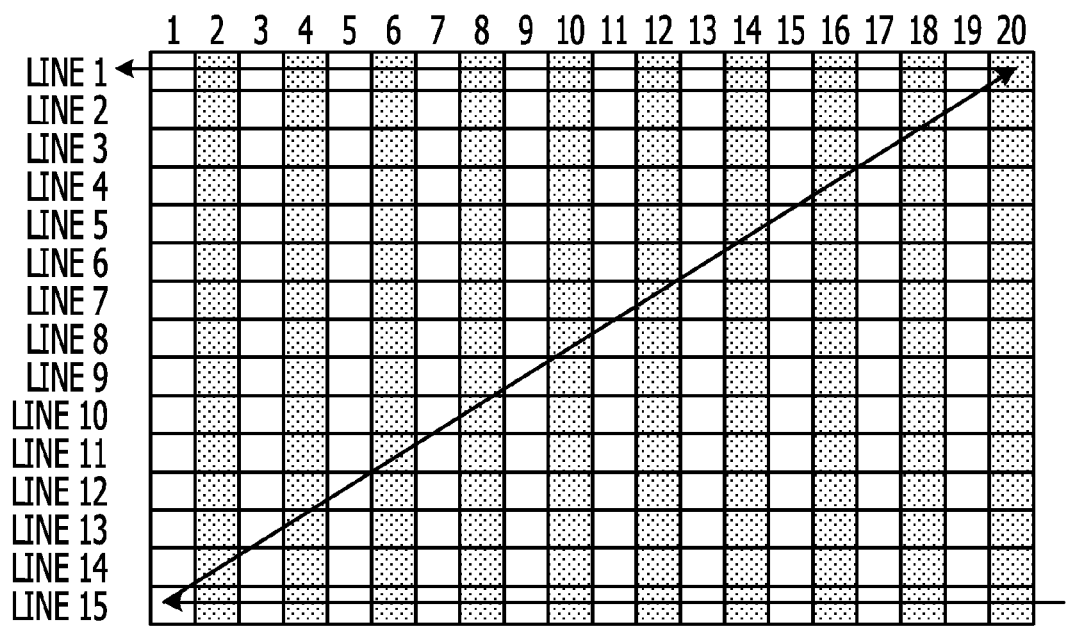
FIG. 9 is a diagram used to describe processing (on the even-numbered pixels) performed by the scan unit in a second embodiment.

FIG. 9 is a diagram used to describe processing (on the even-numbered pixels) performed by the scan unit 112 in the second embodiment. Since the processing that the scan unit 112 performs on the odd-numbered pixels is substantially the same as that in the first embodiment, a description below will also be given with reference to FIG. 2.

First, as illustrated in FIG. 2, the scan unit 112 scans the pixels in sequence starting from the first pixel along line 1 in the pixel array section 111; specifically, it scans the first pixel, the third pixel, the fifth pixel, the seventh pixel, the ninth pixel, the 11th pixel, the 13th pixel, the 15th pixel, the 17th pixel, and the 19th pixel in sequence from the front side of line 1 to the rear side thereof, to read out the captured-image signals of the pixels to the transfer unit 113 in parallel. The transfer unit 113 transfers the read captured-image signals of the odd-numbered pixels on line 1 to the first memory 13.

Next, as illustrated in FIG. 9, the scan unit 112 scans the pixels in sequence starting from the 20th pixel along line 15 in the pixel array section 111; specifically, it scans the 20th pixel, the 18th pixel, the 16th pixel, the 14th pixel, the 12th pixel, the tenth pixel, the eighth pixel, the sixth pixel, the fourth pixel, and the second pixel in sequence from the rear side of line 15 to the front side thereof, to read out the captured-image signals of the pixels to the transfer unit 113 in parallel. The transfer unit 113 transfers the read captured-image signals of the even-numbered pixels on line 15 to the second memory 14.

Next, as illustrated in FIG. 2, the scan unit 112 scans the pixels in sequence starting from the first pixel along line 2 in the pixel array section 111; specifically, it scans the first pixel, the third pixel, the fifth pixel, the seventh pixel, the ninth pixel, the 11th pixel, the 13th pixel, the 15th pixel, the 17th pixel, and the 19th pixel in sequence from the front side of line 2 to the rear side thereof, to read out the captured-image signals of the pixels to the transfer unit 113 in parallel. The transfer unit 113 transfers the read captured-image signals of the odd-numbered pixels on line 2 to the first memory 13.

Next, as illustrated in FIG. 9, the scan unit 112 scans the pixels in sequence starting from the 20th pixel along line 14 in the pixel array section 111; specifically, it scans the 20th pixel, the 18th pixel, the 16th pixel, the 14th pixel, the 12th pixel, the tenth pixel, the eighth pixel, the sixth pixel, the fourth pixel, and the second pixel in sequence from the rear side of line 14 to the front side thereof, to read out the captured-image signals of the pixels to the transfer unit 113 in parallel. The transfer unit 113 transfers the read captured-image signals of the even-numbered pixels on line 14 to the second memory 14.

Thereafter, the scan unit 112 alternately repeats the first scanning (FIG. 2) and the second scanning (FIG. 9) in one frame.

The scan unit 112 also performs the first scanning in the direction from the front side of each line to the rear side thereof, that is, from left to right of each line, and also performs the second scanning in the direction from the rear side of each line to the front side thereof, that is, from right to left of each line.

The above description has been given of a case in which the first scanning is performed in the direction from the front side of each line to the rear side thereof and the second scanning is performed in the direction from the rear side of each line to the front side thereof. However, the arrangement may be such that the first scanning is performed in the direction from the rear side of each line to the front side thereof and the second scanning is performed in the direction from the front side of each line to the rear side thereof. That is, in the second embodiment, one of the first scanning and the second scanning is performed in the direction from the front side of each line to the rear side thereof and the other scanning is performed in the direction from the rear side of each line to the front side thereof.

Figure 10:
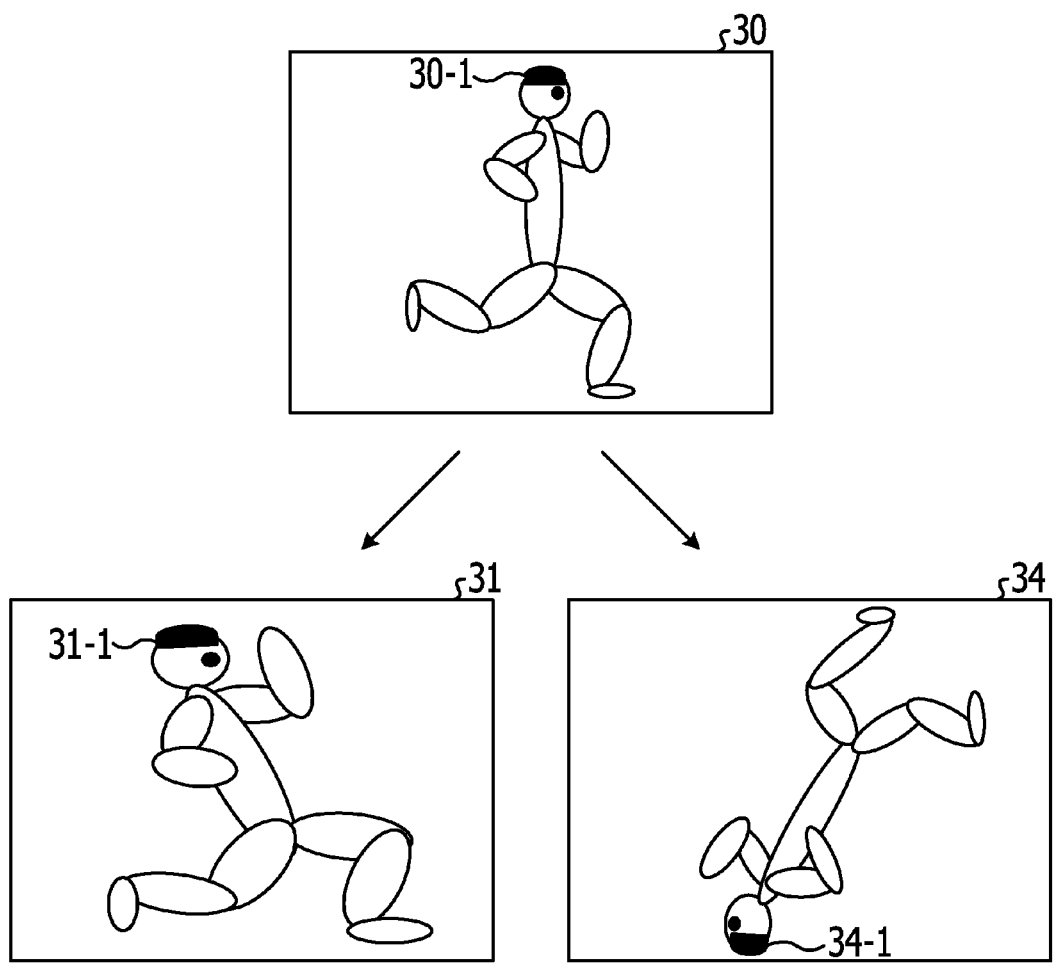
FIG. 10 depicts examples of images resulting from processing performed by the scan unit in the second embodiment.

FIG. 10 depicts examples of images resulting from processing performed by the scan unit 112 in the second embodiment.

The scan unit 112 performs the second scanning in order from line 15 to line 1. The scan unit 112 also performs the second scanning in the direction from the rear side of each line to the front side thereof. Thus, during image capture of a subject 30-1, an image 34 obtained by turning an image 30 upside down (i.e., by rotating an image by) 180° is acquired by the second scanning. The image 34 includes an image 34-1 with a distorted subject image. The image 34-1 is narrower than the subject 30-1. The image 34 is stored in the second memory 14.

<Operation of Captured-Image-Signal Processing Device>

Figure 11:
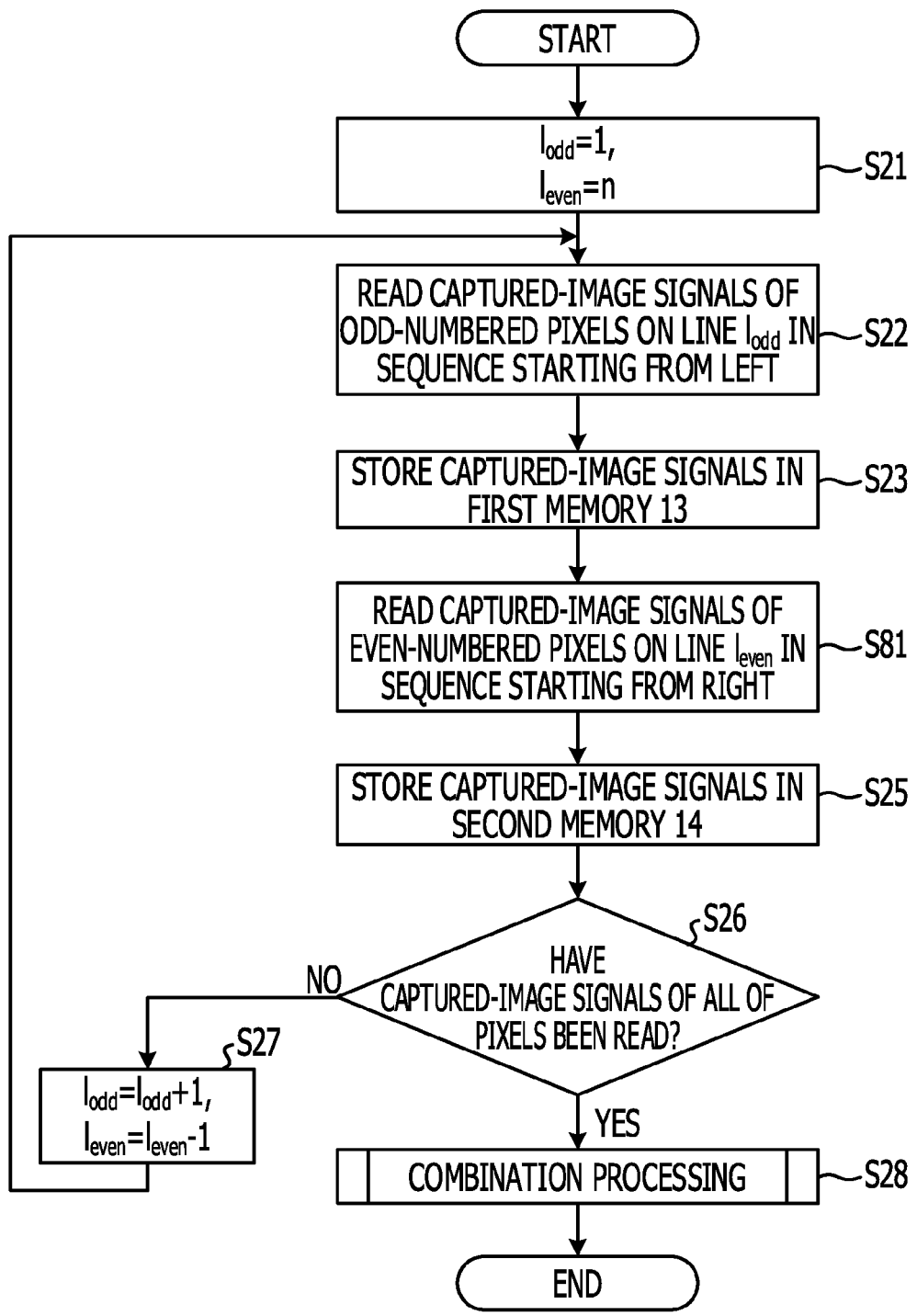
FIG. 11 is a flowchart illustrating an operation of the captured-image-signal processing device according to the second embodiment.

FIG. 11 is a flowchart illustrating an operation of the captured-image-signal processing device according to the second embodiment. In FIG. 11, only a process in step S81 is different from the processes (illustrated in the flowchart of FIG. 5) according to the first embodiment.

In step S81, the scan unit 112 reads out the captured-image signals of the even-numbered pixels on the line $1_{even}$ in sequence starting from the right of the line $1_{even}$, that is, from the rear side to the front side of the line $1_{even}$, to the transfer unit 113.

<Processing Performed by Combining Unit>

Figure 12:
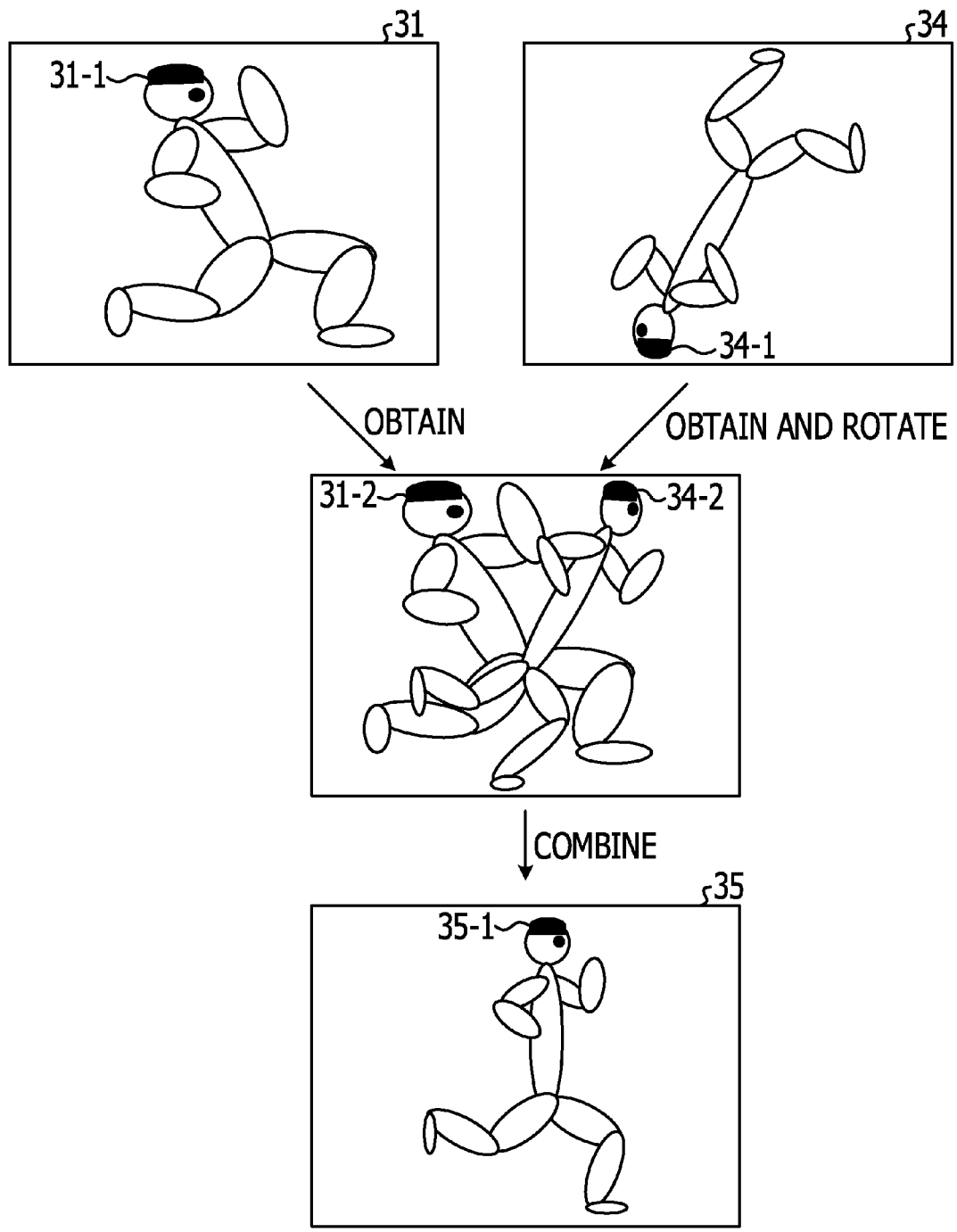
FIG. 12 depicts examples of images resulting from processing performed by the combining unit in the second embodiment.

FIG. 12 depicts examples of images resulting from processing performed by the combining unit 15 in the second embodiment.

An image 34 has been stored in the second memory 14. The image 34 is constituted by the captured-image signals of the even-numbered pixels of the lines in the pixel array section 111.

In accordance with a combination instruction signal input from the control unit 12, the combining unit 15 obtains an image 31 from the first memory 13 and obtains the image 34 from the second memory 14. A distorted image 31-1 included in the image 31 obtained by the combining unit 15 is depicted as an image 31-2, and an image obtained by 180° rotation of a distorted image 34-1, included in the image 34 obtained by the combining unit 15, is depicted as an image 34-2.

The combining unit 15 combines the images 31-2 and 34-2 to generate a composite image 35-1. More specifically, the combining unit 15 combines the captured-image signals of the odd-numbered pixels, the captured-image signals being read from the pixel array section 111 by the first scanning, and the captured-image signals of the even-numbered pixels, the captured-image signals being read from the pixel array section 111 by the second scanning. As a result, the composite image 35-1, which is a distortion-corrected image, is acquired. The image 31-2 is wider than the subject 30-1, whereas the image 34-2 is narrower than the subject 30-1. Thus, as a result of the combination of the images 31-2 and 34-2, the width is also corrected, so that the width of the composite image 35-1 becomes equal to the width of the subject 30-1. An image 35 including the composite image 35-1 is stored in the third memory 16.

Figure 13:
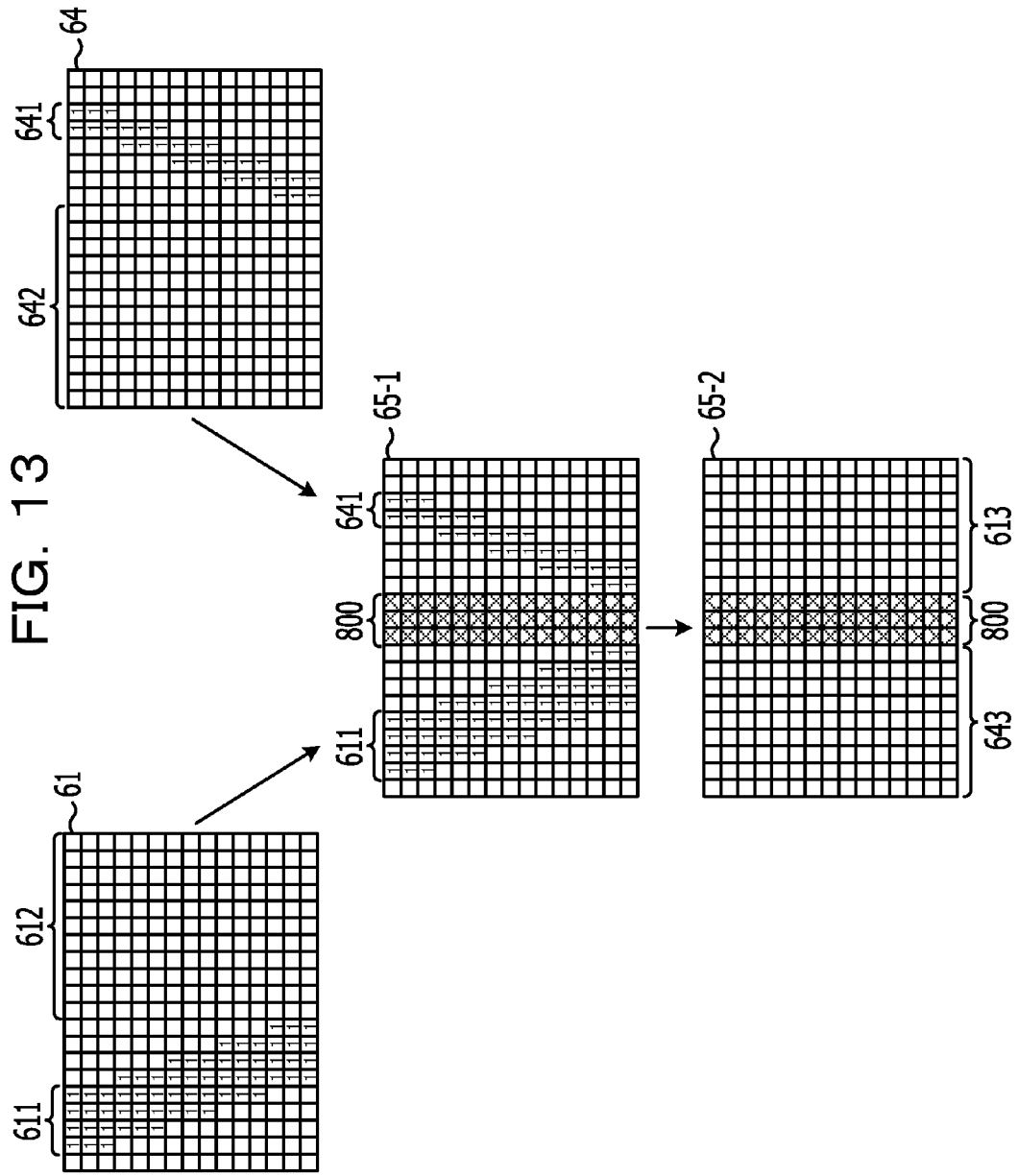
FIG. 13 illustrates processing performed by the combining unit in the second embodiment.

FIG. 13 illustrates processing performed by the combining unit 15 in the second embodiment. In FIG. 13, only the pixels for which determination flags=1 are set are illustrated, and the pixels for which determination flags=0 are set are not illustrated.

An image 64 in FIG. 13 corresponds to an image obtained by rotating the image 34 in FIG. 12 by 180°. An image included in the image 64 and constituted by the captured-image signals of a pixel group 641 for which determination flags=1 are set corresponds to the distorted image 34-2 in FIG. 12. The captured-image signals of a pixel group 642 for which determination flags=0 are set constitute a background image. A composite image 800 in FIG. 13 corresponds to the composite image 35-1 in FIG. 12.

The combining unit 15 selects, from the pixel group 611 and the pixel group 641, pixels existing at the corresponding positions therein and having the same color, and combines the captured-image signals of the selected pixels. As a result, the composite image 800, which is a distortion-corrected image whose color tone is maintained, is acquired. The combining unit 15 also performs, for each line, shrinking processing using the pixels of the pixel group 611 and the pixels of the pixel group 641. The shrinking processing is performed using bilinear interpolation, which is a typical enlarging and shrinking method. For example, as illustrated in FIG. 13, when one line of the pixel group 611 is constituted by four pixels and one line of the pixel group 641 is constituted by two pixels, the combining unit 15 determines that the number of pixels for one line in the composite image 800 is three. As a result, an image 65-1 including the composite image 800 is generated.

Next, the combining unit 15 places the composite image 800 on a background-only image obtained by deleting the image, constituted by the captured-image signals of the pixel group 611, from an image 61, or a background-only image obtained by deleting the image, constituted by the captured-image signals of the pixel group 641, from the image 64. In this case, the combining unit 15 places the composite image 800 at a center position between the pixel groups 611 and 641. As a result, an image 65-2 including the composite image 800 and one of the background images to the left and right of the composite image 800 is generated.

When the composite image 800 is placed on the background-only image of the image 61, the combining unit 15 complements the image 65-2 by using an image constituted by some of the pixels of the pixel group 642 as a background image 643. Alternatively, when the background-only image of the image 64 is placed on the composite image 800, the combining unit 15 complements the image 65-2 by using an image constituted by some of the pixels of the pixel group 612 as a background image 613.

As described above, according to the second embodiment, the scan unit 112 in the captured-image-signal processing device 10 performs one of the first scanning and the second scanning from the front side of each line to the rear side thereof and performs the other scanning from the rear side of each line to the front side thereof, unlike the case in the first embodiment. As a result, the width of the composite image becomes equal to the width of the subject. Thus, the second embodiment allows distortion in an image to be corrected with higher accuracy than the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device for processing captured-image signals, the device comprising:
    a pixel array having a plurality of lines, each line having first pixels and second pixels, the first pixels and the second pixels being arranged alternately;
    a scanner which performs first scanning and second scanning alternately, in one frame, the first scanning for reading, for each line, captured-image signals of the first pixels from a first line to a last line and the second scanning for reading, for each line, captured-image signals of the second pixels; from the last line to the first line; and
    a processor which generates a composite image by combining the read captured-image signals of the first pixels and the read captured-image signals of the second pixels.

2. The device according to claim 1, wherein the first pixels are odd-numbered pixels on each line and the second pixels are even-numbered pixels on each line.

3. The device according to claim 1, wherein the scanner performs one of the first scanning and the second scanning in a direction from a first side of each line to a second side thereof and performs the other scanning in a direction from the second side of each line to the first side thereof.

* * * * *